(12) United States Patent
Sundelin et al.

(10) Patent No.: US 9,529,864 B2
(45) Date of Patent: Dec. 27, 2016

(54) DATA MINING ELECTRONIC COMMUNICATIONS

(75) Inventors: Tore L. Sundelin, Duvall, WA (US); James C. Kleewein, Kirkland, WA (US); Bradford R. Clark, Duvall, WA (US); Jorge Pereira, Seattle, WA (US); James J. Edelen, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 696 days.

(21) Appl. No.: 12/550,189

(22) Filed: Aug. 28, 2009

(65) Prior Publication Data

US 2011/0055196 A1 Mar. 3, 2011

(51) Int. Cl.
*G06F 15/16* (2006.01)
*G06F 17/30* (2006.01)

(52) U.S. Cl.
CPC ... *G06F 17/30539* (2013.01); *G06F 17/30528* (2013.01)

(58) Field of Classification Search
CPC ....... G06F 17/30; G06Q 10/10; G06Q 10/107; G06Q 30/02; G06Q 30/0269; G06Q 30/0254
USPC .................................................. 709/206–207
See application file for complete search history.

(56) References Cited

U.S. PATENT DOCUMENTS

| | | | | |
|---|---|---|---|---|
| 5,850,518 A * | 12/1998 | Northrup | ................... | G06F 9/54 709/203 |
| 5,917,489 A * | 6/1999 | Thurlow | .............. | G06Q 10/107 706/45 |
| 6,028,531 A | 2/2000 | Wanderlich | | |
| 6,424,997 B1 * | 7/2002 | Buskirk, Jr. | ............ | G06F 17/27 709/201 |
| 6,691,106 B1 * | 2/2004 | Sathyanarayan | | |
| 6,832,244 B1 | 12/2004 | Raghunandan | ............... | 709/206 |
| 7,000,194 B1 * | 2/2006 | Newbold | ....................... | 715/789 |
| 7,120,865 B1 | 10/2006 | Horvitz et al. | ............... | 715/210 |
| 7,155,243 B2 * | 12/2006 | Baldwin et al. | .............. | 455/466 |
| 7,222,156 B2 * | 5/2007 | Gupta et al. | ................ | 709/206 |
| 7,293,013 B1 | 11/2007 | Horvitz et al. | ............... | 707/694 |
| 7,454,716 B2 | 11/2008 | Venolia | ........................ | 715/853 |
| 7,469,280 B2 * | 12/2008 | Simpson | .............. | G06Q 10/107 379/100.08 |

(Continued)

FOREIGN PATENT DOCUMENTS

| | | |
|---|---|---|
| JP | Hei 09-54765 | 2/1997 |
| RU | 2327205 C2 | 6/2008 |
| WO | WO 2012/078342 | 6/2012 |

OTHER PUBLICATIONS

Tang et al., "Email Data Cleaning", 2005, retrieved from <http://delivery.acm.org/10.1145/1090000/1081926/p489-tang.pdf?ip=151.207.242.4&acc=ACTIVE%20SERVICE&CFID=106104557&CFTOKEN=32931386&_acm_=1338400941_84aefb47d484c80b467cd91ca447b235>.*

(Continued)

*Primary Examiner* — Waseem Ashraf
(74) *Attorney, Agent, or Firm* — Anand Gupta; Tom Wong; Micky Minhas

(57) ABSTRACT

User insights derived from communication data may be provided. Communications associated with a user may be collected and analyzed to derive insights about the user. The insight may then be provided to the user, such as for modifying an application functionality, creating a message processing rule, providing new information to the user, and updating an application display or user interface.

19 Claims, 3 Drawing Sheets

(56) References Cited

U.S. PATENT DOCUMENTS

| | | | |
|---|---|---|---|
| 7,483,871 | B2 | 1/2009 | Herz .................................. 707/2 |
| 7,519,589 | B2 | 4/2009 | Charnock et al. ................ 707/5 |
| 7,653,879 | B1* | 1/2010 | Sareen et al. .................. 715/752 |
| 7,752,152 | B2 | 7/2010 | Paek et al. |
| 8,065,369 | B2* | 11/2011 | Turski et al. .................. 709/206 |
| 8,744,979 | B2 | 6/2014 | Sundelin et al. |
| 2002/0016824 | A1* | 2/2002 | Leeds ........................... 709/207 |
| 2002/0038307 | A1 | 3/2002 | Obradovic et al. |
| 2002/0041329 | A1* | 4/2002 | Steinberg ........... G07C 9/00142 348/207.99 |
| 2002/0199095 | A1* | 12/2002 | Bandini et al. ............... 713/151 |
| 2003/0023715 | A1 | 1/2003 | Reiner et al. ................. 709/224 |
| 2003/0120593 | A1 | 6/2003 | Bansal et al. .................... 705/39 |
| 2005/0080864 | A1* | 4/2005 | Daniell ......................... 709/206 |
| 2005/0102560 | A1* | 5/2005 | Taketoshi ............. G06F 1/3203 714/14 |
| 2005/0204001 | A1 | 9/2005 | Stein et al. .................... 709/206 |
| 2005/0204009 | A1 | 9/2005 | Hazarika et al. ............. 709/206 |
| 2006/0010217 | A1 | 1/2006 | Sood |
| 2006/0010242 | A1* | 1/2006 | Whitney et al. .............. 709/229 |
| 2006/0031347 | A1* | 2/2006 | Sahi ............................... 709/206 |
| 2006/0080393 | A1* | 4/2006 | Cardone et al. .............. 709/206 |
| 2006/0101119 | A1* | 5/2006 | Qureshi et al. ................ 709/206 |
| 2006/0195467 | A1* | 8/2006 | Pearce .............. G06F 17/30017 |
| 2006/0206938 | A1* | 9/2006 | Petry et al. ....................... 726/22 |
| 2006/0294191 | A1 | 12/2006 | Marston et al. .............. 709/206 |
| 2007/0118498 | A1 | 5/2007 | Song et al. |
| 2007/0124336 | A1* | 5/2007 | Arellano ..................... 707/104.1 |
| 2007/0183655 | A1 | 8/2007 | Konig et al. |
| 2008/0091448 | A1 | 4/2008 | Niheu et al. ....................... 705/1 |
| 2008/0126284 | A1 | 5/2008 | Forbes et al. |
| 2008/0126310 | A1 | 5/2008 | Xu |
| 2008/0126951 | A1 | 5/2008 | Sood et al. .................... 715/752 |
| 2008/0172661 | A1 | 7/2008 | Chatterjee et al. |
| 2008/0249968 | A1 | 10/2008 | Flinn et al. |
| 2009/0003542 | A1* | 1/2009 | Ramanathan et al. ..... 379/88.13 |
| 2009/0006548 | A1* | 1/2009 | Ramanathan et al. ........ 709/204 |
| 2009/0012760 | A1 | 1/2009 | Schunemann |
| 2009/0037541 | A1 | 2/2009 | Wilson |
| 2009/0043621 | A1 | 2/2009 | Kershaw .......................... 705/7 |
| 2009/0106676 | A1 | 4/2009 | Brezina et al. ............... 715/763 |
| 2009/0124241 | A1 | 5/2009 | Krishnaswamy et al. |
| 2009/0150507 | A1 | 6/2009 | Davis et al. |
| 2009/0187912 | A1* | 7/2009 | Lee ....................... G06F 9/4856 718/103 |
| 2009/0222298 | A1 | 9/2009 | Atmaja |
| 2009/0240651 | A1 | 9/2009 | Fletcher et al. |
| 2009/0254498 | A1 | 10/2009 | Gupta et al. |
| 2009/0319456 | A1* | 12/2009 | Consul ................. G06N 99/005 706/21 |
| 2010/0057743 | A1 | 3/2010 | Pierce |
| 2010/0145947 | A1 | 6/2010 | Kolman |
| 2010/0153318 | A1 | 6/2010 | Branavan et al. |
| 2010/0153325 | A1 | 6/2010 | Amoroso et al. |
| 2010/0194920 | A1* | 8/2010 | Gai ..................... H04N 1/00132 348/231.2 |
| 2010/0281126 | A1 | 11/2010 | Masuda |
| 2011/0029465 | A1 | 2/2011 | Ito |
| 2011/0047404 | A1 | 2/2011 | Metzler et al. |
| 2011/0055264 | A1* | 3/2011 | Sundelin ............. G06Q 10/107 707/776 |
| 2011/0106736 | A1 | 5/2011 | Aharonson et al. |
| 2011/0224971 | A1 | 9/2011 | Moore |
| 2012/0143798 | A1 | 6/2012 | Sundelin et al. |
| 2013/0051772 | A1 | 2/2013 | Ramaswamy |
| 2013/0159408 | A1 | 6/2013 | Winn et al. |
| 2014/0351189 | A1* | 11/2014 | Winn ................ G06F 17/30702 706/21 |

OTHER PUBLICATIONS

Addictive Tips; "*Priority Inbox for Outlook 2010? Highlight Only Important Emails via Conditional Formatting*" Sep. 4, 2010; accessed Sep. 21, 2010 at http://www.addictivetips.com/microsoft-office/priority-inbox-for-outlook-2010-highlight-only-important-emails-via-conditional-formatting/; 3 pgs.

Fisher, Danyel Aharon; "*Social and Temporal Structures in Everyday Collaboration*"; Information and Computer Science, University of California, Irvine; 2004; 214 Pgs.

Florea, A., et al; "*An Intelligent Email Agent*"; 2001; Politehnica University of Bucharest; accessed at http://citeseerx.ist.psu.edu/viewdoc/download?doi=10.1.1.36.5134&rep=rep1&type=pdf; 9 pgs.

Gloor, P., et al.; "*Visualization of Communication Patterns in Collaborative Innovation Networks, Analysis of some W3C working groups*"; MIT Center for Coordination Science, Dartmouth Tuck Center for Digital Strategies, Dartmouth College, Dept. of Computer Science; 7 Pgs.

Gmail; "*Priority Inbox Overview*"; Sep. 14, 2010; accessed Sep. 21, 2010 at http://mail.google.com/support/bin/answers.py?hl=en&answer=186531; 1 pg.

Greif, I., et al.; "*Communication Trends and the On-Demand Organization*"; A Lotus Workplace White Paper, CUE Collaborative User Experience, IBM T.J. Watson Research Center; May 2003; 18 Pgs.

IBM; "*Triage and Capture: Rethinking Mobile Email*" Jan. 5, 2010; accessed Sep. 21, 2010 at http://www.almaden.ibm.com/cs/projects/mobileemail/; 5 pgs.

Lifehacker.com; "*Email Prioritizer Adds 'Pause' Button, Auto-Ranking to Email*"; Aug. 20, 2008; accessed Sep. 21, 2010 at http://lifehacker.com/400639/email-prioritizer-adds-pause-button-auto+rankinig-to-email; 2 pgs.

McCulloh, I., et al.; "*Unobtrusive Social Network Data From Email*"; Network Science Center, United States Military Academy; 6 Pgs.

SNS UK; "*Open Text Email Management 10 Redefines Email Classification to Combat Content Overload*"; Oct. 23, 2009; accessed Sep. 21, 2010 at http://www.sns-uk.co.uk/news_full.php?id=1796&title=Open-Text-Email-Management-10-Redefines-Email-Classification-to-Combat-Content-Overload-; 2 pgs.

U.S. Appl. No. 12/550,292, filed Aug. 28, 2009, entitled "*Data Mining Organization Communications*"

U.S. Appl. No. 12/961,180, filed Dec. 6, 2010, entitled "*Electronic Communications Triage*"

"*Email Mining Toolkit (EMT)*"; http://www1.cs.columbia.edu/~wl318/idswork.htm; 8 Pgs.

Salvatore, J., et al.; "*Behavior-based Modeling and its Application to Email Analysis*"; Columbia University; 41 Pgs.

Lim, Mark Jyn-Huey; "*Computational Intelligence in E-mail Traffic Analysis*"; University of Tasmania; May 2008; 257 Pgs.

PCT Application Publication No. WO2006/038036, entitled Processing electronic communications, Apr. 13, 2006.

International Search Report and Written Opinion in PCT/US2011/061571 dated Jun. 1, 2012, 9 pages.

U.S. Official Action dated Aug. 9, 2013 in U.S. Appl. No. 12/961,180, 22 pages.

U.S. Official Action mailed Apr. 22, 2013 in U.S. Appl. No. 12/961,180, 42 pages.

U.S. Official Action mailed Nov. 19, 2013 in U.S. Appl. No. 12/550,292, 41 pages.

Chinese Office Action mailed Jan. 16, 2014, issued in CN Application. 201110416640.7.

U.S. Official Action mailed Jul. 8, 2104 in U.S. Appl. No. 12/550,292, 28 pages.

EP Communication dated Jul. 4, 2014 in Application No. PCT/US2011/061571, 8 pgs.

EP Communication dated Dec. 8, 2014 in Application No. PCT/US2011/061571, 5 pgs.

U.S. Official Action mailed May 22, 2015 in U.S. Appl. No. 12/550,292, 42 pages.

U.S. Appl. No. 13/360,594, filed Jan. 27, 2012, entitled Action-Oriented User Experience Based on Prediction of User Response Actions to Received Data.

(56) References Cited

OTHER PUBLICATIONS

Agichtein, et al., "Learning User Interaction Models for Predicting Web Search Result Preferences", Retrieved at <<http://mentor.coventry.ac.uk/MentorMaterials/learning%20user%20interaction%20models%20for%20predicting%20web%20search%20result%20preferences.pdf>>, Proceedings of the 29th annual international conference on Research and development in information retrieval {SIGIR), Aug. 6-7, 2006, pp. 8.

Dredze, et al., "Intelligent Email: Reply and Attachment Prediction", Retrieved at <<http://www.cs.jhu.edu/-mdredze/publications/dredze_intelligent_email_iui08.pdf>>, 13th International conference on intelligent user interfaces, Jan. 13-16, 2008, pp. 70-77.

U.S. Official Action mailed Nov. 7, 2013 in U.S. Appl. No. 13/360,594, 21 pgs.

U.S. Official Action mailed Apr. 24, 2014 in U.S. Appl. No. 13/360,594, 15 pgs.

U.S. Official Advisory Action mailed Sep. 24, 2014 in U.S. Appl. No. 13/360,594, 5 pgs.

U.S. Official Action mailed Dec. 18, 2014 in U.S. Appl. No. 13/360,594, 12 pgs.

U.S. Official Action mailed May 21, 2015 in U.S. Appl. No. 13/360,594, 13 pgs.

U.S. Official Action mailed Oct. 2, 2015 in U.S. Appl. No. 13/360,594, 15 pgs.

U.S. Official Action mailed Dec. 7, 2015 in U.S. Appl. No. 12/550,292; 41 pgs.

Japan Notice of Reason for Rejection dated Sep. 18, 2015 in Appl. No. 2013-543185, 11 pgs.

Fujikawa et al., "A Study of Keyword-Based Information Filtering System"; Printed in the Research Report by The Information Processing Society of Japan; published on Feb. 28, 1997, pp. 37-42, No. 20, vol. 97, 8 pgs. (No English Lang Translation).

Damiani, E. et al., "P2P-Based Collaborative Spam Detection and Filtering", 2004, In Peer-to-Peer Computing, Proceedings 4th Int'l Conference, pp. 176-183, IEEE.

U.S. Appl. No. 13/360,594, Office Action mailed May 5, 2016, 18 pgs.

Russian Notice of Allowance in Application 2013125971, mailed May 20, 2016, 19 pgs.

\* cited by examiner

DATA MINING ELECTRONIC COMMUNICATIONS

RELATED APPLICATION

Related U.S. patent application Ser. No. 12/550,292 filed on even date herewith and entitled "Data Mining Organization Communications," assigned to the assignee of the present application, is hereby incorporated by reference.

BACKGROUND

Data mining electronic communications is a process for analyzing a user's electronic communication data. In some situations, users receive a flood of electronic communication data every day. This deluge often outstrips their ability to effectively consume and manage the data using current tools. In conventional systems, tools can be insufficient because they cannot search, sort, or filter the data using more sophisticated or intuitive characteristics beyond basic keywords. Furthermore, the tools may be unable to provide the user information about the relationships that exist between multiple pieces of communication data. The tools may also lack functionality such as the ability to learn common management and organization tasks by observing user behavior.

SUMMARY

Data mining of electronic communications may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

User insights derived from communication data may be provided. Communications associated with a user may be collected and analyzed to derive insights about the user. The insight may then be provided to the user, such as for modifying an application functionality, creating a message processing rule, providing new information to the user, and updating an application display or user interface.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
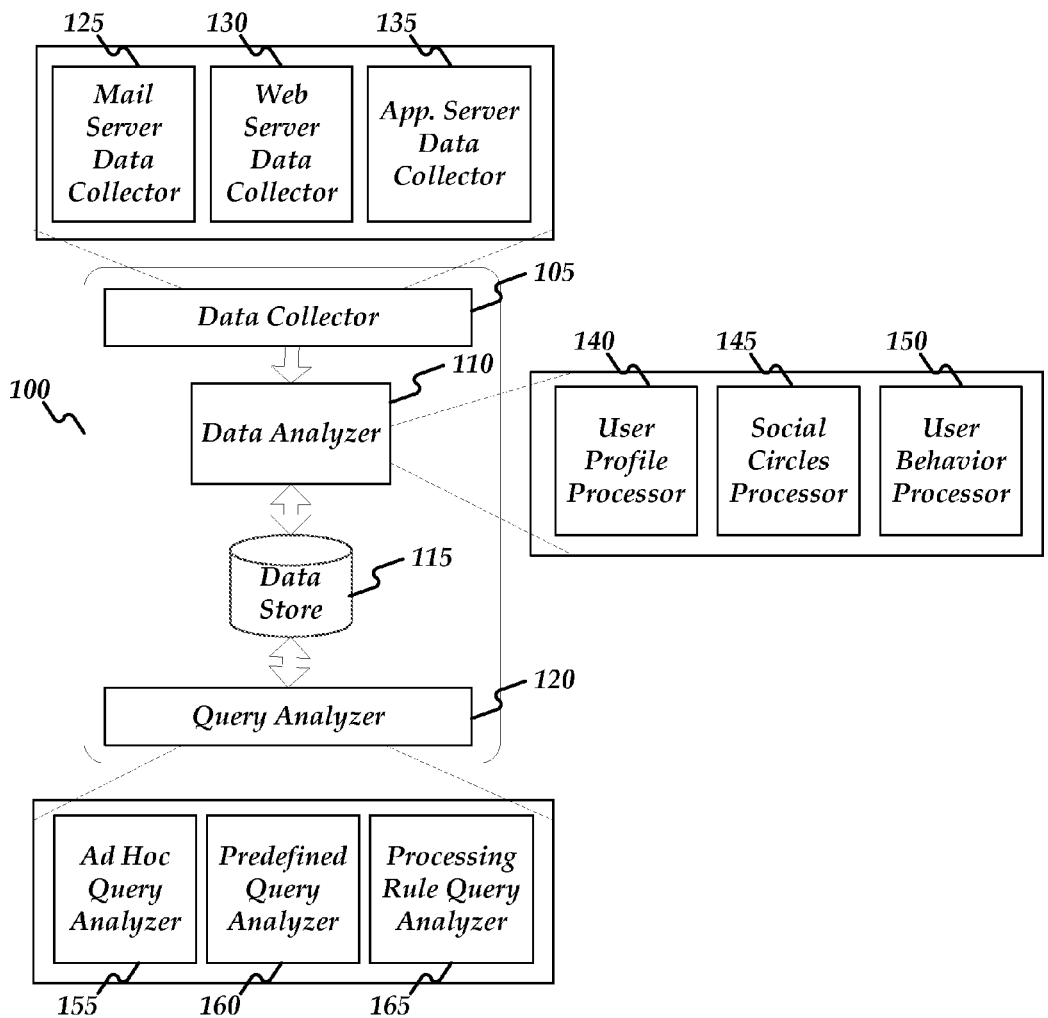
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Data mining of user communications may be provided. Consistent with embodiments of the present invention, user's electronic communications, such as e-mail messages, calendar items, instant messages (IMs), Short Message Service (SMS) messages, forum postings, documents, voicemail, web updates (e.g., "tweets" and other social networking status updates), etc, may be analyzed to provide sophisticated insights. For example, insights may describe who a user communicates with and about what, how a user manages messages with a given set of attributes, and the relative priority of two communications on the same topic but from different senders. Embodiments may integrate with various communication applications, such as an e-mail client, to provide these insights and power new or advanced functionality. This may help enable users to find the data they need more quickly, filter and organize their data more intuitively, and prioritize and triage their communication data more efficiently.

Vast amounts of electronic communication data associated with a user may be sifted and sorted in order to derive valuable insights based on the data. Those insights may be made available to the end users and applications that need it. These insights may drive new application features that may enable users to find the communication data they need more quickly, organize and filter their data more intuitively, and prioritize and triage their data more efficiently. Deriving the insights may comprise stages of data collection, data analysis, and data delivery, each accomplished by one and/or more extensible software modules. For example, multiple, specialized data collectors may each support the collection and delivery of a particular type of raw data to the data analyzers. Additional modules may support later developed insight scenarios that may be plugged in and used alongside the other modules. This modularized and extensible architecture may also provide a high degree of customizability as a variety of these specialized modules may be selectively combined to address specific, targeted needs.

FIG. 1 is a block diagram of an operating environment 100 operative to provide data mining of a user's communications. Operating environment 100 may comprise a data collector 105, a data analyzer 110, a data store 115, and a query analyzer 120. Data collector 105 may collect and aggregate raw data from a variety of electronic communication and related sources, such as e-mail data, web portal data, and directory data. As various sources often package and transmit data in different formats, the invention may be comprised of multiple, logical data collector modules that support these differences, such as a mail server data collector 125, web server data collector 130, and application server data collector 135.

Data collector 105 may prepare the collected data prior to and/or as part of analysis. Preparation tasks may comprise cleansing, extraction, and annotation. Cleansing may comprise repair and/or cleanup activities, such as spelling correction and removal of useless or confusing data (e.g. signature lines) from an e-mail message. Extraction and annotation may comprise identifying and/or categorizing key data for use in analysis, such as the identification of a string of characters in an IM message as a contact's name or phone number. Data preparation tasks may vary depending on the data source and/or the type of analysis to be performed. For example, unnecessary white space may be removed prior to analysis, but how this white space is formatted may vary between a calendar appointment and an SMS message and the different logical preparation flows may support these differences. For another example, different data sources may comprise different fields and/or formatting and the data preparation may identify these fields and/or formatting and extract information accordingly.

Once data collection and preparation has been completed, the prepared data may be delivered to data analyzer 110, comprising modules such as a user profile processor 140, a social circles processor 145, and a user behavior processor 150. Other modules may comprise an organization processor for providing insights at an organizational level and/or a partner processor for providing insights regarding interactions between organizations. Each logical data analyzer module may be comprised of multiple types of workflows, such as heavyweight, medium weight, and lightweight batch processing. Heavyweight workflows may be used to generate a new insight or set of insights for a particular user and may require that the analyzer pore over a large data set to determine an accurate value for the insights. Medium weight batch processing may be used to process and analyze new raw data in a batch in order to update existing insights. Lightweight processing may be used in real-time to generate or update insights as data is collected or generated.

Each insight or class of insight may be generated and updated using any and/or all three types of workflows. Consistent with embodiments of the invention, to improve performance of the systems in which it is integrated, the different workflows for a single logical analyzer module, such as user profile processor 140, may be executed on different machines. For example, operating environment 100 may be deployed on a high availability e-mail cluster. The resource intensive batch analysis workflows can execute using the spare cycles of a passive node, while the lightweight, real-time workflows can execute using cycles on the active node. For example, insights may comprise profile data, habits, preferences, interests, relationships, areas of expertise, demographic data, priority and/or urgency of a given item or topic, new, derivable items based on the content of existing items, observed and predicted communication item management, triage, and consumption behavior, and/or social or interaction circles and related topics of communication. Insights may be derived based on the analysis of multiple, individual items, such as word processing documents shared with a user on a web collaboration portal and/or multiple types of items, such as e-mail messages, calendar items, and directory data.

Query analyzer 120 may produce a variety of insights based on communication patterns, behaviors, and relationships of users. Query analyzer 120 may comprise modules that may analyze and derive insights based on a user's interactions with operating environment 100, such as an ad hoc query analyzer 155, a predefined query analyzer 160, and a processing rule query analyzer 165. Ad hoc query analyzer 155 may receive input from applications that may expose functionality allowing users to formulate ad-hoc searches and sorts using derived insights. For example, a user may request a list of all current "hot" e-mail items, such as a list of all items with a derived priority above a certain threshold. Predefined query analyzer 160 may process application and/or user defined searches, sorts, and filters, such as an IM application dynamically grouping contacts based on discussion topics or derived relationships. Processing rule query analyzer may allow applications and/or users to create processing rules on communication items based on derived insights. For example, an e-mail application may expose an "auto-attendant" feature that may enable the user to choose to allow the system to organize, flag, and even delete new items based on derived insights into how a user has managed similar items previously.

Consistent with embodiments of the invention, additional data may be requested for the derivation of a particular insight. For example, when analyzing the priority of a message, directory data on the sender may be requested to determine if he is a peer, report, or manager of the recipient. For another example, to determine topics of interest to a user, content extraction may determine key topics across key data types, such as e-mail messages, calendar items, IM messages, and/or forum posts. A frequency or "hit rate" for each key topic based on the number of communication items pertaining to it may be calculated and modified based on user actions such as whether a user read, ignored, responded, and/or deleted the item. A modifier may also be based on sentiment detection in user responses, such as happy, sad, surprised, liked, disliked, etc.

A stack ranking of "interests" based on modified ratings may be maintained as user insights and may be used to derive still other insights such as the priority of a particular e-mail message. For example, content extraction may be performed on mail messages to determine key topics, those key topics may be compared to the user interest stack ranking, and modifiers may be applied based on the recipient's relationship to the sender (e.g., boss, spouse, friend, random sender on a web forum) and any related calendar appointment data (e.g. time proximity and priority rating of appointments.) A probability or confidence rating may be assigned to insights as appropriate (e.g. 0%>X<100%, where a rating of 100% would represent an irrefutable fact). This confidence rating may depend upon a number of factors including the number and type of sources.

Analysis may comprise an ongoing and iterative process. While some insights may be static (such as gender), others may be dynamic (such as social circles). As new data is processed, the insight as well as its associated confidence rating may change over time. Additionally, time itself can influence both the insight (e.g., age of a user or urgency of an item) as well as its confidence rating (e.g., lack of new data will slowly decay confidence in a user's current address).

Data collected by data collector 105 and/or processed by data analyzer 110 may be stored in data store 115. Queries and insights derived by query analyzer 120 may also be stored in data store 115 and provided to users. For example, users may access and/or query the insights derived by the invention from a plurality of query endpoints. Each of these logical endpoints may vary in either the query syntax and/or query type they support. As an example, some endpoints may support natural language queries (e.g. "Show me all e-mails from my wife") while other endpoints may require defined syntax queries (e.g. "Type: E-mail, Sender Relationship: Spouse.") These queries may be stored in data store 115 and analyzed by query analyzer 120 to derive insights. For example, a query of "Show me all e-mails from my wife" may result in a high confidence insight that the user is male and married.

In addition to the query syntax, different endpoints may also support different types of queries, such as ad-hoc queries, user defined queries, system defined queries, and/or processing rules. For ad-hoc queries, applications may expose functionality that allows users to formulate ad-hoc searches and sorts using derived insights, such as requesting a list of all current "hot" e-mail items (e.g., a list of all items with a derived priority above a certain threshold.) User and/or system defined queries may comprise searches, sorts, and/or filters using derived insights created by an application or a user, such as grouping contacts in a communication application based on discussion topics or derived relationships to sender (e.g., friend, co-worker, family.) Processing rules may be created on communication items based on derived insights such as exposing an auto-attendant feature that may enable a user to choose to allow the system to organize, flag, and/or delete new items based on derived insights into how a user has managed similar items previously.

Users may be able to view the derived insights and/or a summary of their derivation. This may help users to know what types of insights are available for use in customizing features in their applications. This may also help users to understand the behaviors of features that act on derived insights and update or correct insights. The ability for users to provide such input can act as a feedback loop to drive better accuracy for a particular insight as well as to tune broader analysis and system behavior. System administrators may be provided with a high degree of control and oversight. For example, administrators may have the ability to control elements such as what data is processed, what insights are derived, who can access the insights, etc.

Through query analyzer 120 and/or the use of applications that may rely on the insights stored in data store 115, the user may provide iterative feedback on the insights. For example, the user may specify particular insights of interest, such as project group members, that the user desires to collect and use. The user may also specify insights explicitly with a high confidence rating (e.g., 100%), such as an address, zip code, gender, interests, and/or phone number.

Data collection and analysis may be performed on a computer or computers acting as servers. This design may provide several benefits, such as allowing a user to view and leverage the same, derived insights from any instance of a communication application. This may enable a unified user experience that spans applications and devices. This may also enable resource constrained devices to be able to leverage complicated insights which their own limited processing capabilities cannot provide effectively. However, the design of the invention allows client software to perform any amount of additional analysis and customization of data and insights locally as may be required by the application and/or the user.

Figure 2:
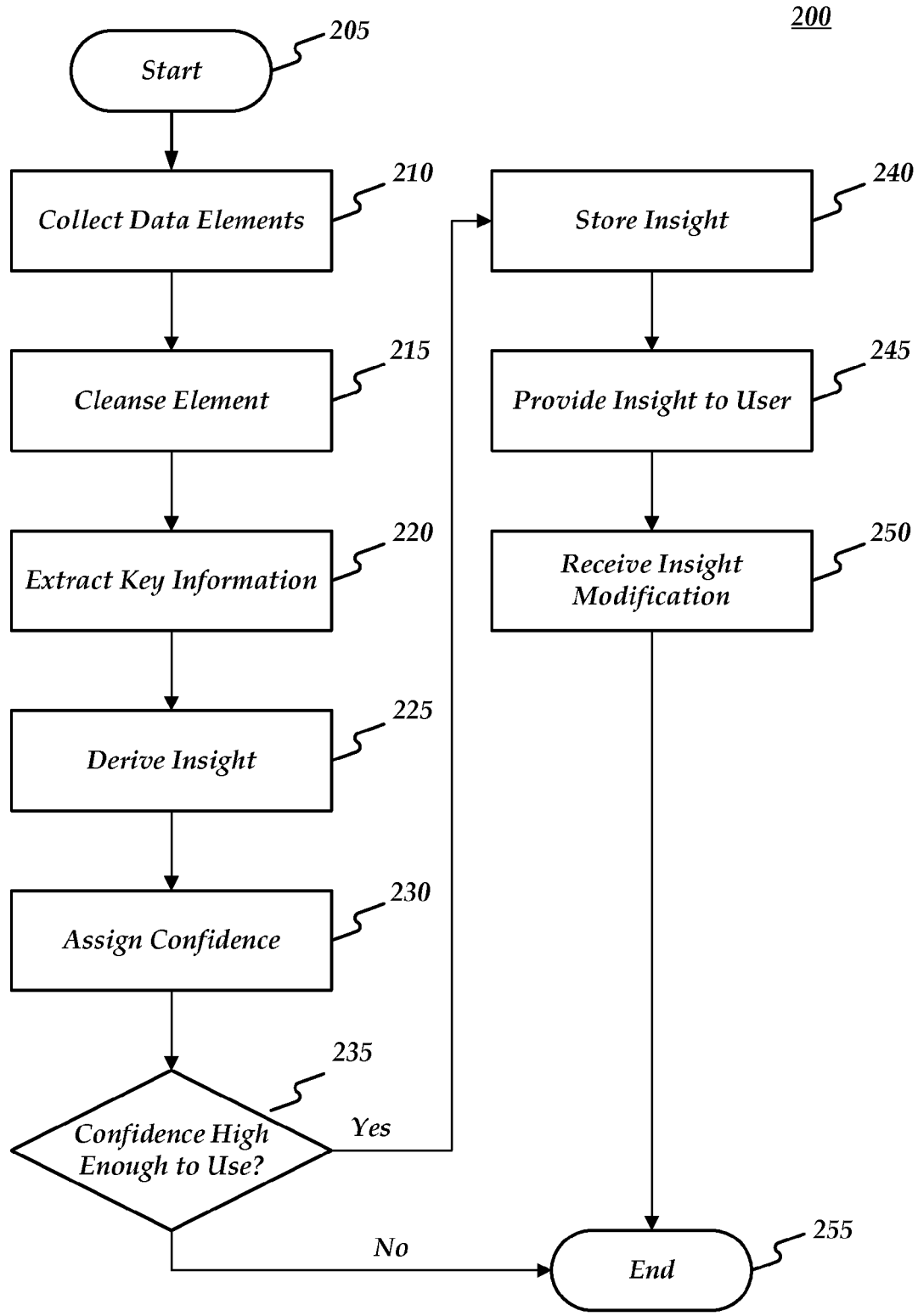
FIG. 2 is a flow chart of a method for providing data mining of user communications.

FIG. 2 is a flow chart setting forth the general stages involved in a method 200 consistent with an embodiment of the invention for providing data mining of user communications. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may collect a plurality of data elements. For example, data associated with a user such as e-mails, instant messages (IMs), short message service (SMS) messages, voicemail, search queries, forum and/or blog postings, documents, directories, contact lists, calendar appointments, and task entries may be collected by data collector 105. Data outside of operating environment 100 may also be collected, such as friend lists, posted items, and status updates from social networking sites.

From stage 210, where computing device 300 collected the data elements, method 200 may advance to stage 215 where computing device 300 may cleanse at least one of the data elements. For example, computing device 300 may remove unneeded whitespace or extraneous elements such as an email signature from the data element. Consistent with embodiments of the invention, cleansing may comprise data correction and/or normalizations. For example, spelling errors may be corrected while zip codes may be validated and/or modified to include additional data such as ZIP+4 information. For another example, dates and times may be normalized and/or localized into a common format.

After cleansing the data element in stage 215, method 200 may advance to stage 220 where computing device 300 may extract key information from the data elements. For example, a name, a phone number, a key word, a contact address, an urgency, an associated topic, a subject area, a type of communication, a date, a user action, a user feedback, a relationship between the user and a sender of the at least one of the plurality of communications, and contact methods (e.g., email address or phone number) may be identified from the data elements. Consistent with embodiments of the invention, computing device 300 may also annotate the extracted information. For example, the extracted information may be labeled with an identifier and/or stored in a hierarchical data structure, such as an XML tree.

From stage 220, method 200 may advance to stage 225 where computing device 300 may analyze the extracted key information to derive an insight. For example, data analyzer 110 may process the key information, which may be stored in data store 115, according to insight criteria for each of the insight processors. Insights may comprise data items of interest to the users of the system. An example insight may comprise a list of the key decision makers in an organization.

Data analyzer 110 may comprise multiple modules that may work independently and/or together called intelligence processors. Each processor may produce a particular type of insight or group of insights based on the data it receives. For example, user profile processor 140 may determine whether a user is a subject matter expert for a particular topic. To determine whether the user is a subject matter expert, the analysis may comprise analyzing mail message content and subject lines to determine key topics of the user's communications, defining a social circle for the user comprising senders and recipients of the user's messages, determining key influencers within a circle by analyzing active and/or engaged participants, and determining which users are subject matter experts based on analysis of content of responses of key influencers.

From stage 225, method 200 may advance to stage 230 where computing device 300 may assign a confidence to the derived insight. Insights may comprise a scaled confidence rather than an established fact. Many insights are probabilistic inferences based on analysis logic. For example, demographic details such as gender determination may be based on e-mail content. A message containing, "I'm staying home to take care of my husband," may infer that the sender is likely female with a high confidence rating whereas the phrase, "I just made the ice hockey team," may comprise a relatively lower degree of confidence that the sender is male. For example, an explicit profile update by a user with respect to the user's gender may comprise a confidence of 100%, deriving the user's gender from multiple emails sent referencing "my husband" may comprise a confidence of 85%, and deriving the user's gender based on participation in an activity may only comprise a confidence rating of 30%. The confidence rating for a given insight may change over time and as new data is processed. A user's gender may not change over time, but the user's job or marital status may. Thus, insight processing may be ongoing as insights from data store 115 are fed back into data analyzer 110 for additional processing and/or updates.

Method 200 may then advance to stage 235 where computing device 300 may determine whether the derived insight is high enough to use. Computing device 300 may comprise a different confidence threshold confidence rating for each processor, derived insight, application, and/or user. For example, user profile processor 140 may comprise a confidence threshold of 75% before insights may be used while social circles processor 145 may comprise a confidence threshold of 50%. Individual insights in a processor may comprise a different threshold, such as requiring an 80% confidence before establishing a user's gender by user profile processor 140. For another example, insights derived from one application, such as an email application, may be associated with a higher confidence than other applications. Users may also customize confidence ratings, such as by verifying insights, setting user preferences, and/or explicit weighting configurations for different sources and/or applications.

If the confidence of the derived insight is not high enough, method 200 may end at stage 255. Otherwise, at stage 235, if computing device 300 determines that the insight confidence is high enough to use, method 200 may advance to stage 240 where computing device 300 may store the insight, such as in data store 115. For example, computing device 300 may comprise a server accessible by the user from a plurality of remote locations so that the user may have access to the derived insights and/or functionalities from multiple locations.

From stage 240, method 200 may advance to stage 245 where computing device 300 may provide the insight to the user. The insight may be provided in a number of ways, such as creating a processing rule, generating data for use by the user, adding and/or modifying functionality of an application, and/or providing the insight data to the user in response to a query.

For example, dynamic folders and/or views may be provided based on the user's communication habits, directory data, social circles, etc. Users may quickly see who they most frequently communicate with and sort or search these contacts by criteria like context (e.g., work, personal, church) or topic (e.g., project management, triathlons, charity work.) Prioritization of communications may be provided by creating and/or updating a "hot items" folder containing items that may be of the most immediate interest, such as by including emails on topics the user is most actively communicating about and/or communications from contacts to which the user often most quickly responds (e.g., management or spouse.)

Processing rules may be generated based on behavior insights, such as by suggesting and/or creating mailbox rules based on observed user behavior. For example, a rule may be created to automatically move all and/or all newly received messages with a particular set of characteristics to a particular folder. Insights may also be provided to users in response to search queries (e.g., search for a key decision maker.) For example, a user may issue a search to determine who the key decision makers are on a particular project. A contact and/or contacts, with and/or without the confidence rating, may be returned to the user based on insights regarding the user's relationships, the contacts' areas of expertise, and/or the contacts' areas of responsibility.

Insights may be used to group related items for display to the user. For example, the user may receive an email from a colleague about a feature issue discussed in a previous communication. The previous communication may be displayed alongside the newly received email, for example, based on an insight derived from a plurality of common keywords and/or people (e.g. sender and recipient.) Consistent with embodiments of the invention, an email message may be cleansed (e.g., stripped of noise words unrelated to the topic) and a list of subject keywords and associated users may be extracted to generate a thumbprint for each email message, such as a synopsis string and/or a checksum value. Related items may be found by calculating a vector between the thumbprint of the email messages by correlating the keywords and users. Messages with the smallest vector difference may be the most related items and an ordered list of the top N related conversations with a certain threshold confidence may be displayed to the user.

A content synopsis of communications may be provided to the user. For example, portions of a communication comprising popular or high priority keywords may be displayed as part of a preview of the communication. Consistent with embodiments of the invention, users may also enter a content summary as a field of the communication.

Users may be able to train and/or configure insights for items and manipulate them. The insights used to provide a particular functionality and/or display may be displayed, and the user may adjust the weighting and/or turn the insight on or off to adjust the behavior of the application using the insight. For example, a user may lower the priority of messages associated with a topic not related to the user's current project. Users may also define custom rules for item processing based on combinations of insights.

Raw data may be collected, analyzed to derive new insights, stored, and delivered to various applications by the invention. The analysis itself may comprise an iterative process in which derived insights may be periodically updated by factors such as the introduction of new raw data, user feedback, and/or ongoing analysis.

After providing the insight to the user in stage 245, method 200 may advance to stage 250 where computing device 300 may receive a modification to the insights from a user and/or an administrator. An application may receive a request from the user to display a list of the criteria used in providing insight-based functionality. The application may display the list in a user interface element operative to allow the user to enable and disable each criterion and/or change the weighting used. For example, derived insights may be used to display a longer preview of messages from a spouse than messages from a colleague. The user may opt to weight messages from the colleague higher in order to prioritize those messages and cause the email application to display a longer preview. These insight modifications may comprise an ongoing, iterative process. That is, the user may adjust criteria and/or weightings multiple times in response to changing desires or attempts to finely tune the provided insights. For another example, a user may provide an explicit correction to a derived insight, such as an address, full name, and/or job title. Such explicit updates may comprise a very high confidence rating.

Similarly, derived insights and/or confidence values may be updated without user intervention. For example, data analyzer 110 may update an insight related to a user's marital status based on e-mails and/or calendar appointments related to "my wedding." Consistent with embodiments of the invention, confidence ratings may slowly decay over time unless corroborating data is identified. For example, a current mailing address for a user may slowly lose confidence until a new communication verifying the address is processed.

Consistent with embodiments of the invention, a user dashboard may be provided to give the user a consolidated view of communication items. The dashboard may allow the user to control which items appear and what prominence (e.g., highlighting and prioritizing) they have. Changes to the insight may be stored, in data store 115 for example, and method 200 may then end at stage 255.

An embodiment consistent with the invention may comprise a system for providing electronic communication data mining. The system may comprise a memory storage and a processing unit coupled to the memory storage. The processing unit may be operative to collect communication data, derive a user insight based on the collected data, and modify an application's functionality based on the derived insight. The insight may comprise a habit, a preference, an interest, a relationship, a prioritization, an area of expertise, and a demographic factor, an active topic, and a triage behavior. For example, the application may apply a triage behavior such as creating a processing rule to move or prioritize incoming communications based on an insight about the user's interests and/or current projects.

Modifying the application may comprise, for example, creating a contact group, re-ordering a message list, applying a visual property to a message associated with the insight, creating a processing rule to be applied to incoming communications, creating an alert associated with a communication associated with another user, creating a processing rule for future communications, modifying a processing rule for future communications, reorganizing stored data associated with the application, and creating an association of a plurality of data associated with the application. The system may be further operative to display an explanation of the factors used to derive the insight and receive edits to the insight.

Another embodiment consistent with the invention may comprise a system for providing communication data mining. The system may comprise a memory storage and a processing unit coupled to the memory storage. The processing unit may be operative to analyze user communications, derive insights from the analyzed communications, and provide the insight to the user. The insight may be provided by creating a message processing rule, providing at least one new piece of information to the user, updating an application display, and/or adding at least one functionality to an application. Message processing rules may be created and applied to modify incoming communications that match properties used to derive the insight. For example, the system may derive an insight identifying a user's supervisor and may create a messaging rule to prioritize communications from the supervisor in a sorted list of communications. For another example, communications from the supervisor may be displayed with a longer preview while other communications may be displayed with a shorter or no preview.

Yet another embodiment consistent with the invention may comprise a system for providing user insights through data mining. The system may comprise a memory storage and a processing unit coupled to the memory storage. The processing unit may be operative to collect communication data elements, cleanse the elements, such as by spell-checking or removing extraneous characters and/or whitespace, extract key information from the data elements, analyze the key information to derive an insight, and assign a confidence probability to the insight. If the insight's confidence is high enough, the insight may be stored and provided to the user. The system may be further operative to receive modifications to the insight and/or the criteria on which the insight is based. For example, the user may provide a rating feedback on the insight or disable one of the criteria.

Figure 3:
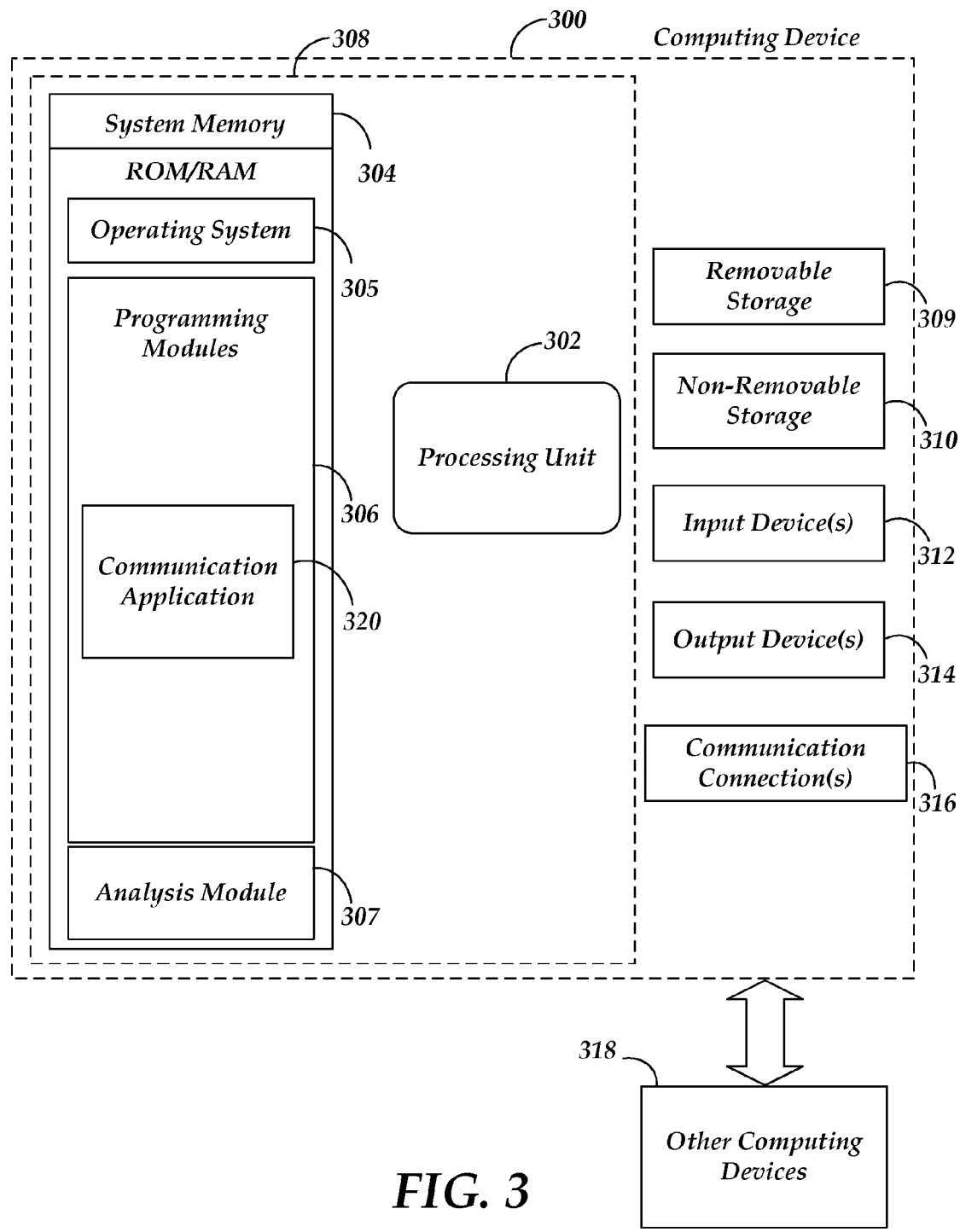
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include an analysis module 307 (e.g., user profile processor 140). Operating system 305, for example, may be suitable for controlling computing device 300's operation. In one embodiment, programming modules 306 may include a communication application 320, such as an IM or email application. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. communication application 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing electronic communication data mining, the method comprising:
    collecting a plurality of communications associated with a user, wherein the plurality of communications comprise a plurality of data types comprising at least two of the following: an e-mail, an instant messages (IM), a short message service (SMS) message, a voicemail, a search query, a public posting, a document authored by the user, a directory of a plurality of users, a contact list, a calendar appointment, and a task entry;
    delivering the plurality of collected communications to at least one data analyzer module, the at least one data analyzer module comprising a plurality of weighted workflows, each of the plurality of weighted workflows comprising a different level of processing for generating insights and updating insights based on at least one of batch data, collected data and generated data, the plurality of weighted workflows comprising at least a medium weight workflow for updating existing insights based on the at least one of the batch data and a lightweight workflow for at least one of generating and updating the insights in real-time, the plurality of workflows being executed on a plurality of machines in a high availability cluster, the plurality of machines including at least one active node utilized by the lightweight workflow and one passive node utilized by the medium weight workflow, the medium weight workflow utilizing a resource intensive batch analysis that is executed using spare cycles of the passive node;
    deriving, utilizing one or more of the plurality of weighted workflows, an insight about the user from the collected plurality of communications, the insight about the user being based on at least one of the following: a processor type used to derive the insight and a communication type for at least one of the collected communications from which the insight is derived; and
    modifying at least one application functionality based on the derived insight.

2. The method of claim 1, wherein the derived insight comprises at least one of the following: a habit, a preference, an interest, a relationship, a prioritization, an area of expertise, and a demographic factor, an active topic, and a triage behavior.

3. The method of claim 1, wherein the derived insight is stored on a server accessible by the user from a plurality of clients.

4. The method of claim 1, further comprising assigning a confidence to the derived insight.

5. The method of claim 1, further comprising updating the derived insight according to analysis of at least one of the following: a newly received communication and a newly sent communication.

6. The method of claim 1, further comprising receiving an edit to the derived insight.

7. The method of claim 6, wherein the edit to the derived insight is received from at least one of the following: the user and an administrator.

8. The method of claim 1, wherein modifying the at least one application comprises at least one of the following: creating a contact group, re-ordering a message list, applying a visual property to a message associated with the insight, creating a processing rule to be applied to incoming communications, creating an alert associated with a communication associated with another user, creating a processing rule for future communications, modifying a processing rule for future communications, reorganizing stored data associated with the application, and creating an association of a plurality of data associated with the application.

9. The method of claim 1, further comprising displaying an explanation of the derived insight to the user.

10. The method of claim 9, wherein displaying the explanation of the derived insight to the user comprises displaying at least one factor used to derive the insight and a user interface element operative to edit the at least one factor used to derive the insight.

11. The method of claim 1, further comprising cleansing the collected plurality of communications prior to analysis.

12. The method of claim 1, wherein deriving the insight comprises extracting, from at least one of the plurality of communications, at least one of the following: a name, a phone number, a key word, a contact address, an urgency, an associated topic, a subject area, a type of communication, a date, a user action, a user feedback, a relationship between the user and a sender of the at least one of the plurality of communications.

13. A tangible computer-readable device which stores a set of instructions which when executed performs a method for providing communication data mining, the method executed by the set of instructions comprising:
    analyzing a plurality of communications associated with a user utilizing at least one data analyzer module, the at least one data analyzer module comprising a plurality of weighted workflows, each of the plurality of weighted workflows comprising a different level of processing for generating insights and updating insights based on at least one of batch data, collected data and generated data, the plurality of weighted workflows comprising at least a medium weight workflow for updating existing insights based on the at least one of the batch data and a lightweight workflow for at least one of generating and updating the insights in real-time, the plurality of workflows being executed on a plurality of machines in a high availability cluster, the plurality of machines including at least one active node utilized by the lightweight workflow and one passive node utilized by the medium weight workflow, the medium weight workflow utilizing a resource intensive batch analysis that is executed using spare cycles of the passive node, wherein the plurality of communications comprise a plurality of data types comprising at least two of the following: an e-mail, an instant messages (IM), a short message service (SMS) message, a voicemail, a search query, a public posting, a document authored by the user, a directory of a plurality of users, a contact list, a calendar appointment, and a task entry;
    deriving an insight based on the analyzed plurality of communications; and
    providing the insight to the user when the insight based on at least one of the following: a processor type used to derive the insight and a communication type for at least one of the collected communications from which the insight is derived, wherein providing the insight to the user comprises at least one of the following: creating a message processing rule, providing at least one new piece of information to the user, updating an application display, and adding at least one functionality to an application.

14. The tangible computer-readable device of claim 13, further comprising storing the insight on a server accessible by the user from a plurality of locations.

15. The tangible computer-readable device of claim 13, wherein creating a message processing rule comprises:
   deriving the insight using a property associated with the plurality of communications,
   creating the message processing rule according to the derived insight to be applied to at least one newly received communication, and
   modifying the at least one newly received communication, wherein the at least one newly received communication matches the property used to derive the insight.

16. The tangible computer-readable device of claim 15, wherein the property used to derive the insight comprises at least one of the following: a sender, a recipient, a subject, a time, a priority, and a keyword.

17. The tangible computer-readable device of claim 15, wherein providing the insight to the user comprises sorting the plurality of communications for display according to a criteria of the derived insight.

18. The tangible computer-readable device of claim 15, wherein providing the insight to the user comprises displaying a longer preview for a preview of a first communication of the plurality of communications and a shorter preview of a second communication of the plurality of communications.

19. A system for providing user insights through data mining, the system comprising:
   a memory storage; and
   a processing unit coupled to the memory storage, wherein the processing unit is operative to:
      collect a plurality of data elements from a plurality of sources associated with a user, wherein the plurality of sources comprises at least two of the following: a document, an e-mail, an SMS message, a voicemail, a search query, a web submission, a forum posting, a blog posting, a calendar item, a to-do list entry, an instant message, and a directory;
      cleanse at least one data element of the plurality of data elements, wherein being operative to cleanse the at least one data element comprises at least one of the following: being operative to perform a spell check on the at least one data element, validate the at least one data element, normalize the at least one data element, correct the at least one data element, and remove at least one extraneous character from the at least one data element;
      extract at least one piece of key information from the at least one data element, wherein the at least one piece of key information comprises at least one of the following: a sender, a recipient, a time, a subject, a contact method, a related communication, and a storage location;
      analyze the at least one piece of key information utilizing at least one data analyzer module comprising a plurality of weighted workflows, each of the plurality of weighted workflows comprising a different level of processing for generating insights and updating insights based on at least one of batch data, collected data and generated data, the plurality of weighted workflows comprising at least a medium weight workflow for updating existing insights based on the at least one of the batch data and a lightweight workflow for at least one of generating and updating the insights in real-time, the plurality of workflows being executed on a plurality of machines in a high availability cluster, the plurality of machines including at least one active node utilized by the lightweight workflow and one passive node utilized by the medium weight workflow, the medium weight workflow utilizing a resource intensive batch analysis that is executed using spare cycles of the passive node, the analyzed at least one piece of key information being utilized to derive an insight associated with the user, wherein the derived insight comprises at least one of the following: a behavior, a pattern, a relationship, an interest, a preference, a demographic factor, and an expertise;
      assign a confidence probability to the insight;
      determine whether the assigned confidence probability of the insight meets a threshold level to provide the insight to the user, the threshold level to provide the insight being based on at least one of the following: a processor type used to derive the insight and a communication type for at least one of the collected communications from which the insight is derived;
      in response to determining that the assigned confidence probability of the insight is high enough to provide the insight to the user, provide the insight to the user wherein being operative to provide the insight to the user comprises at least one of the following: creating a message processing rule, providing at least one new piece of information to the user, updating an application display, and adding at least one functionality to an application;
      store the insight in a location accessible by the user from a plurality of clients; and
      receive at least one modification to the insight from the user, wherein the at least one modification comprises at least one of the following: a feedback rating, a disabling of a use of at least one of the plurality of data elements, an enabling of a use of at least one of the plurality of data elements, a disabling of the insight, an enabling of the insight, a weighting of at least one of the plurality of data elements, and a modification of the confidence probability.

* * * * *